Aug. 27, 1963
D. H. McCUEN
3,101,771
LIQUID FUEL SYSTEM FOR VEHICLES
Filed May 31, 1960
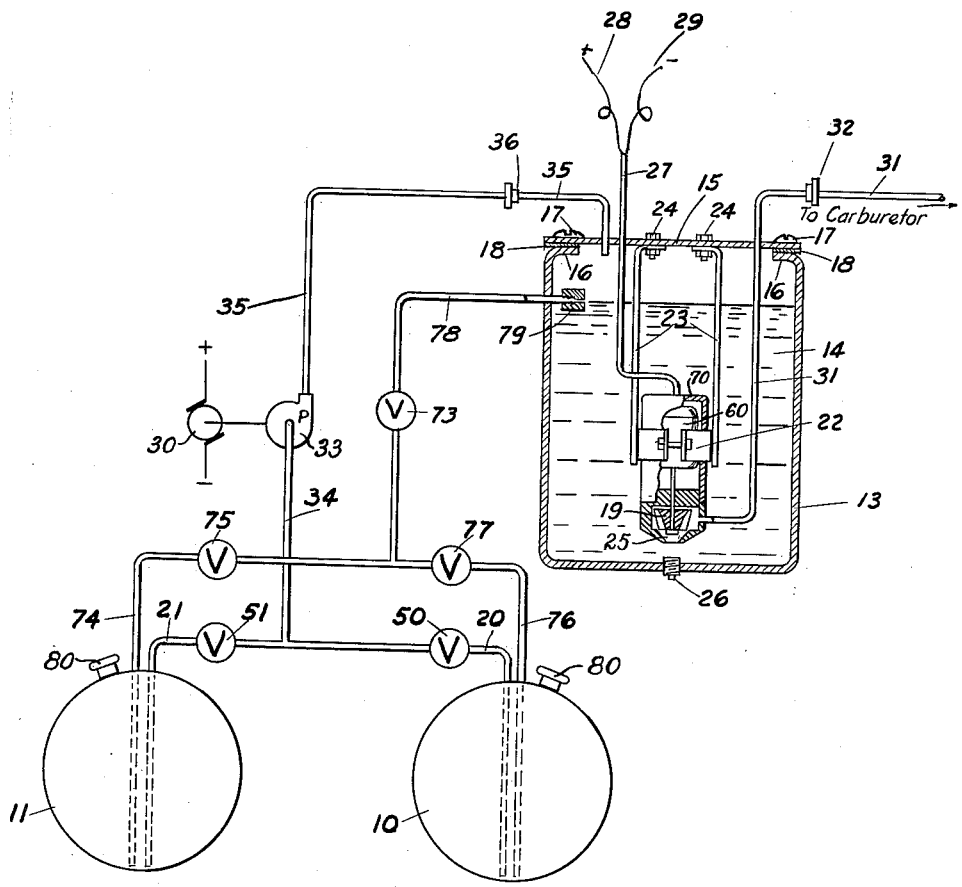
INVENTOR.
DONALD H. McCUEN
BY

United States Patent Office 3,101,771
Patented Aug. 27, 1963

3,101,771
LIQUID FUEL SYSTEM FOR VEHICLES
Donald H. McCuen, Box 354, White Pigeon, Mich.
Filed May 31, 1960, Ser. No. 33,612
1 Claim. (Cl. 158—36.3)

This invention relates to a fuel system for vehicles, particularly to a system including a submerged pump for forwarding liquid fuel to the carburetor of the engine. This application is a continuation-in-part application of my co-pending application Serial No. 821,309, filed June 18, 1959, and now abandoned.

It is common practice in the case of vehicles which are driven by engines burning liquid fuel to forward the fuel from a supply tank mounted on the vehicle to the carburetor by means of a pump. In the case of passenger vehicles the pump is generally mounted on the engine in such a way that it is actuated directly by the engine and serves to draw fuel from the fuel tank through one conduit and to forward it to the carburetor through another conduit.

Recently, however, it has become common practice in the case of trucks and other heavy duty vehicles to mount an electrically driven fuel pump directly in the fuel tank in a location such that it is at all times actually submerged in the liquid fuel. This arrangement has certain advantages for such vehicles due, in part, to the fact that the pump can operate even though the engine of the vehicle is not running, thus assuring a supply of fuel to the carburetor when it is desired to start the engine. Furthermore, fuel tanks on such vehicles are often mounted at a considerable distance from the engine and well below the level of the carburetor so that the avoidance of the drawing of fuel through a long vacuum line and often through a considerable height with the attendant danger of vapor lock is desirable. These and other advantages are claimed for fuel systems involving a fuel pump submerged in the liquid fuel in such a way that the intake of the pump is always covered with liquid fuel. With such an arrangement there is no danger of the supply of fuel to the pump being interrupted.

Such systems as heretofore devised have, however, invariably suffered from serious disadvantages due in great measure to the arrangement of the parts of the system. Thus, it has been the accepted practice to install the submerged fuel pump directly in the main fuel supply tank. Many trucks and other vehicles are equipped with a plurality of fuel supply tanks and it has been necessary to install a submerged pump in each fuel tank with the attendant expense. Of a more serious nature, however, is the fact that it is generally necessary that the fuel tank, or tanks, be mounted on the vehicle either under the body or under the cab or in some other location difficult of access. In view of the fact that the pump, should it need servicing, must be removed from the fuel tank, it often becomes a major operation to service the pump. Because of the usual location of such tanks, it is generally necessary to demount the tank from the vehicle to provide access to the pump. Since the tank may contain fifty gallons, or more, of fuel, the operation presents difficulties. It is even often necessary for the mechanic removing or installing a pump to work with his arms submerged in the liquid fuel for considerable periods of time. The unhandy and even dangerous nature of the operation thus makes it practically essential that, should the fuel pump fail and need servicing while the vehicle is on the road, a service vehicle be called and the disabled vehicle towed to a garage or other station equipped with facilities for removing the fuel tanks themselves. The delay and expense caused by such a situation can be readily appreciated.

An additional disadvantage of the use of submerged fuel pumps in the way heretofore practiced arises from the fact, mentioned previously, that a separate pump must be installed in each fuel supply tank. This makes it essential that a selector valve be provided in the conduit system between the several pumps and the carburetor. Only by the installation of such a valve can the fuel feed to the carburetor be switched from one supply tank to another. Even with the installation of such a selector valve, it becomes necessary for the operator of the vehicle to watch carefully the supply of fuel remaining in the tank from which fuel is being used to be sure that he does not operate the valve either too late, after the tank has become empty and the engine has stopped for lack of fuel, or too soon while there is still so much fuel in the tank that at the next filling it will hold only a partial tankful, thus necessitating uneconomical frequent stops for fuel. Suitable selector valves are available but they are invariably costly. Furthermore, because they must be installed in lines carrying fuel under pressure, the danger of leakage with the attendant cost of the fuel lost is great and the danger of fire from the leaking fuel is considerable, especially in the case of vehicles burning gasoline.

A further disadvantage of mounting a submerged fuel pump in a large supply tank arises from the fact that, as the vehicle travels up or down hill with the fuel supply relatively low, the fuel may flow away from the pump leaving the intake uncovered whereupon uneven running or even stoppage of the engine may occur even though the fuel supply is not entirely exhausted.

According to the present invention the disadvantages of fuel systems using submerged fuel pumps in the way heretofore employed are largely overcome and the advantages of such systems preserved, all in a more economical fashion than in any way heretofore disclosed. According to the the present invention a submerged fuel pump of conventional type is employed but instead of being located in the main fuel supply tank as heretofore practiced it is mounted in a pump container which can be secured at any convenient place on the vehicle where it is easily accessible for servicing the pump. The pump container need be of a size only large enough to accommodate the submerged pump conveniently, generally with a capacity not greater than about one gallon. Fuel is withdrawn from the storage tank and forwarded to the pump container to maintain the supply therein by any convenient kind of pump, as will be apparent as the description proceeds. Should the submerged pump need servicing, it is then only necessary to remove it from the conveniently located pump container and to make such adjustments as may be necessary. With a suitably designed pump container it is entirely feasible for the operator of the vehicle to remove and adjust the pump himself or even to remove a defective pump and install a new one without special tools and with a minimum of delay. The necessity for demounting a large fuel supply tank from the vehicle in order to remove the submerged fuel pump from such a tank is avoided as is also the necessity of working with, or in, large quantities of fuel, such as may be retained in the main supply tank when a pump needs servicing. The necessity of installing a separate costly submerged fuel pump in each fuel supply tank is also avoided.

The invention can be understool readily from the accompanying, largely schematic drawing wherein, in the interest of clarity, certain features are shown on a somewhat exaggerated scale.

Referring to the drawing, there is illustrated a pair of conventional liquid fuel supply tanks 10 and 11. The tanks 10 and 11 are secured in conventional manner at any suitable location on a truck or other vehicle driven by an engine to the charge forming device or carburetor of which fuel is supplied from the tanks 10 and 11. There is also illustrated one modification of a fuel and pump container 13 adapted to contain liquid fuel 14 and constituting an essential part of the present invention. The fuel and pump container 13 can be of any convenient shape and capacity to enable it to function as hereinafter described and is preferably formed with a cover 15 which can be removed easily. In use the pump container 13 is mounted at some convenient location on the vehicle, e.g. on an exposed frame member, where it is readily accessible and where the cover 15 can be removed without difficulty for access to the interior of the container. In the illustration given, the upper end of the side wall of the container 13 is turned inward to form a horizontal circular flange 16 and the cover 15 is a flat plate secured to the flange 16 by means of screws 17, a suitable gasket 18 being interposed between the plate 15 and the flange 16. However, any other convenient arrangement of the container can be employed. The pump container 13 is conveniently mounted on the vehicle by means of a conventional encircling band, not shown, the ends of which are bolted to a member of the vehicle and the band drawn tight. Any desired manner of mounting the pump container can be employed.

A conventional submerged fuel pump 19, herein sometimes referred to as a "first" pump, is mounted inside the pump container 13. In the illustration the pump 19 a centrifugal pump driven by an electric motor 60, the motor and pump being assembled in conventional fashion in a housing 70 as a unit and the housing being clasped by an encircling band 22, the band in turn being integral with, e.g. welded to, a bracket 23, the opposite end of the bracket being secured to the cover 15, as by bolts 24. With this convenient arrangement it is apparent that to remove the pump 19 from the pump container 13 it is only necessary to remove the screws 17 whereupon the cover of the container and the pump can be removed and the pump serviced or replaced with another. The pump 19, which is of a type adapted to forward fuel under essentially constant pressure rather than to forward a constant volume of fuel, suitably an electrically driven centrifugal pump of conventional design adapted for operation when completely submerged in liquid fuel, is preferably mounted in the container 13 so that its intake port 25 is as close to the bottom of the container as convenient to insure adequate feed of liquid fuel to the pump even though the container itself may not be full of liquid. It is, of course, understood that the pump 19 can be mounted in the container 13 in any suitable way. A conventional drain plug 26 can be provided in the bottom of the pump container 13 for cleaning purposes, if desired.

A suitable liquid-tight conduit 27, which may be either flexible or inflexible, is connected in liquid-tight fashion to the housing 70 and extends in liquid-tight fashion, as by a suitable fitting, through the cover 15 to a convenient location outside the pump container 13 where connection can be made from the electrical system of the vehicle to lead wires 28 and 29 extending through the conduit 27 for conducting electric current to the pump motor. Convenient switches, not shown, can be installed, e.g. on the instrument panel of the vehicle, by means of which the flow of electric current to the pump motor can be interrupted when desired.

The outlet port of the submerged pump 19 is connected to a suitable conduit 31 for conveying liquid fuel from the pump to the carburetor, not shown, of the engine. The conduit 31, sometimes herein referred to as a "first" conduit, is formed of suitable tubing or hose and passes in liquid-tight fashion, as by way of a suitable fitting, through the wall of the pump container 13, suitably through the cover plate 15. The conduit 31 is preferably in sections with a connector 32 joining sections thereof at a convenient location outside the container 13 but near the cover 15. This facilitates removal of the cover plate 15 since the connector 32 can be disconnected and only the short section of the conduit 31 lying between it and the cover plate and inside the pump container 13 will remain attached to the cover plate. Alternatively, the employment of a suitable fitting for carrying the conduit 31 through the cover 15 enables the conduit to be disconnected at the fitting. It is apparent that with the arrangement thus far described and with the circuit for conveying electrical current to the motor driving the pump 19 completed and with liquid fuel in the container 13, fuel will be forwarded to the carburetor of the motor under essentially constant pressure by way of the conduit 31 regardless of whether or not the engine itself is running. Flooding of fuel into the carburetor is prevented in conventional fashion by the float valve which is an integral part of the carburetor.

A "second" or "line" pump 33 adapted to the handling of the liquid fuel involved is employed to forward liquid fuel from the supply tanks 10 and 11 to the pump container 13. The line pump 33 can be mounted at any convenient location on the vehicle but is preferably mounted at a location not greatly above the level of the top of the supply tanks 10 and 11. When so mounted the suction side of the line pump will be required to elevate liquid fuel from the supply tanks 10 and 11 for a minimum height. It is also convenient, as will be apparent later, to provide a conventional type of line pump 33, conveniently a centrifugal pump driven by an electric motor 30, which, when it is not running, allows liquid to bleed through it in either direction. Such pumps are well known and are available commercially.

A "second" conduit 34 is provided which connects the supply tanks 10 and 11 by way of branching conduits 20 and 21 with the line pump 33 and through which liquid fuel is drawn from the tanks to supply the pump. It is preferable for each of the conduits 20 and 21 to pass in liquid-tight fashion, as by way of a suitable fitting, through the upper side of the respective tank 10 or 11 to keep the exposed conduit as far removed as possible from the danger of being injured or broken by flying stones or by uneven terrain over which the vehicle may pass. It is preferable, also, that each of the conduits 20 and 21 extend inside the respective supply tank to practically the lowest point in the tank so that a maximum amount of the liquid fuel in the tank can be withdrawn from it. Liquid fuel is conveyed from the pump 33 to the fuel and pump container 13 by way of a suitable "third" conduit 35 which passes in liquid-tight fashion, as by way of a suitable fitting, through the wall or through the cover of the container. In instances where the conduit 35 passes through the cover 15 of the pump container it is convenient to insert a connector 36 in the line near the cover 15 to facilitate removing the cover as described in connection with the connector 32 in the conduit 31. It is preferable that the conduit 35 deliver fuel into the container 13 near the upper part thereof for reasons which will be apparent later. When the conduit 35 communicates with the interior of the container 13 through the side wall of the container it is, of course, unnecessary to insert the connector 36 in the conduit near the container. It is not necessary that the third conduit 35 extend for any appreciable distance into the container 13. Shutoff valves 50 and 51 are preferably installed in the conduits 20 and 21, respectively, to allow fuel to be withdrawn from either supply tank 10 or 11 alone when desired.

The operation of the apparatus as described thus far when using fuel from the supply tank 11, for example, is as follows: With an adequate supply of liquid fuel in the supply tank 11, the line pump 33 is started and liquid fuel is pumped into the container 13. In the event the container 13 is newly installed and contains no liquid fuel, only a limited amount of liquid can be forced into the container 13 against the pressure of the air therein once the intake 25 of the pump 19 is submerged. By then stopping the line pump 33 the pressure of the air in the container 13 forces the liquid in the conduit 35 in the reverse direction through the pump 33 and enables the pressure in the container 13 to be relieved by way of the conduit 35, the pump 33, the conduit 34, the conduit 21 and the supply tank 11, the latter necessarily being fitted with a conventional breather vent 80. The pump 33 can then be started again and the process repeated three or four times until the pump container 13 is essentially filled with liquid fuel. It will be apparent that this procedure of repeatedly starting and stopping the pump 33 is unnecessary once a supply of liquid fuel is contained in the fuel and pump container 13. Alternatively, a supply of liquid fuel can be placed in the container 13 before the cover is secured in place. In the latter instance it is merely necessary to start both the pumps 19 and 33, either at the time the engine is started or slightly before, and a constant supply of fuel to the carburetor under essentially constant pressure is assured. Even though the supply of fuel furnished to the container 13 by the line pump 33 may be of an intermittent nature due to a low supply of fuel in the tank 11, or for other reasons, it is apparent that the intake port 25 of the submerged pump 19 will at all times be covered with liquid fuel and that under such conditions a satisfactory constant supply of fuel to the carburetor is assured.

It will also be apparent from the foregoing that, should the submerged pump cease to function and require servicing, it is only necessary to disconnect the connectors 32 and 36 and to remove the screws 17 whereupon the cover 15, the pump 19 and short sections of the conduits 31 and 35 can be removed as a unit and the pump repaired or adjusted, or a new pump installed. The operation can be carried out quickly and conveniently without the use of special tools or facilities and without the necessity of disturbing the main supply tank 11. It should also be pointed out that, since the submerged pump 19 is preferably a centrifugal pump through which liquid can bleed in either direction when the pump is not running, and that, since the line pump 33 preferably also allows liquid to bleed through it in either direction when it is not running, it is entirely feasible should either pump cease to function for the other to carry the load temporarily and to forward fuel from the supply tank 11 through the disabled pump, the pump container 13 and the several conduits mentioned to the charge forming device or carburetor until such convenient time as the disabled pump can be repaired or replaced.

As mentioned previously, the apparatus of the invention avoids the necessity of installing a submerged fuel pump in each fuel supply tank when the vehicle is equipped with a plurality of such tanks. As illustrated, it is only necessary when a plurality of fuel supply tanks are mounted on the vehicle, such as the tanks 10 and 11, to install a conduit, such as the conduits 20 and 21, in each fuel supply tank and to connect each of them with the conduit 34 which conducts liquid fuel to the line pump 33. By installing a shut-off valve, such as the valves 50 and 51, in each of the respective conduits 20 and 21, a single line pump 33 can be employed for withdrawing fuel from any desired one of the fuel supply tanks.

An additional feature which can be incorporated in the apparatus of the invention includes an overflow conduit 78 which communicates in liquid-tight manner with the interior of the pump container 13, preferably at a level near the top of the container. The overflow conduit 78 communicates with each fuel supply tank, e.g. by way of conduits 74 and 76 installed in the supply tanks 11 and 10, respectively. Each of the conduits 74 and 76, extends through a wall of the respective supply tank 11 or 10 with its end located at essentially the lowest point in the tank in a manner similar to the conduits 21 and 20 referred to previously. Suitable shut-off valves 75 and 77 can be installed in the conduits 74 and 76, respectively, if desired, to enable the fuel to overflow from the pump container 13 to either, or both, of the fuel supply tanks, as desired.

The overflow conduit 78 is adapted, e.g. by way of a suitable flow-restricting means, to regulate the rate at which liquid fuel overflowing from the pump container 13 is conveyed to the fuel supply tank, or tanks, at a value less than the difference between the rate at which the line, or second, pump 33 is capable of forwarding liquid fuel to the pump container 13 and the rate at which fuel is used by the engine under normal operating conditions of the line pump and engine. Under such conditions, and employing the preferred centrifugal line pump 33, the level of liquid fuel in the pump container 13 will remain at a level at least as high as the point of communication of the overflow conduit 78 with the pump container 13. Furthermore, the conduit 78 and the conduits 74 and 76 communicating therewith will at all times remain full of liquid fuel, as will the pump 33 and the conduits 20, 21, 34 and 35 associated therewith as long as the submerged pump 19 is operating. With this condition prevailing, any failure of the line pump 33 to function will not interfere with the flow of fuel from the fuel supply tank to the pump container 13 since any forwarding of fuel out of the container 13 to the carburetor of the vehicle by the pump 19 will merely serve to draw more fuel from the fuel supply tank into the pump container 13 by way of one, or both, of the conduits 35 and 78, thus assuring the proper operation of the fuel supply system even though the line pump 33 be temporarily inoperative.

Any suitable flow-restricting means can be employed to adapt the overflow conduit 78 to the regulation to a desired value of the rate at which liquid fuel overflowing from the pump container 13 is conveyed to a fuel supply tank. Thus, the end of the conduit 78 communicating with the pump container 13 can be fitted with a tip 79 having a restricted orifice, which can, if desired, be removable so that the rate at which the conduit 78 will return fuel to the supply tank can be adjusted by using tips having orifices of different sizes. Alternatively, the conduit 78 may merely be a conduit having a diameter suitably smaller than the conduit 35 or a suitable valve 73 can be inserted in the conduit 78 and the valve partially closed to regulate the rate of conveyance of liquid fuel by the conduit 78 to a desired value. The valves 75 and 77 can be employed in similar manner. Other conventional flow-restricting means can be used in association with the conduit 78, if desired. Generally speaking, however, the provision of a tip 79 having a suitably sized orifice is preferred as providing a more accurate control of the rate of flow of returning fuel without the necessity of adjusting valves.

An additional advantage arises from the provision of the flow-restricting means in the conduit 78. Should the submerged pump 19 in the pump container 13 cease to function, the capacity of the line pump 33 to deliver fuel to the container 13 at a rate greater than the combined rate of consumption of fuel by the engine and of the return of fuel to the supply tank by the overflow conduit 78 insures the continued flow of liquid fuel from the pump container through the non-operating pump 19 and the conduit 31 to the carburetor of the vehicle. This furnishes an alternate means for insuring the continuance of a supply of fuel to the carburetor of the vehicle even though either one of the pumps 33 or 19 should become temporarily inoperative.

I claim:

In a fuel system suitable for use with an engine-driven vehicle wherein liquid fuel is carried in a plurality of supply tanks mounted on the vehicle and is pumped under positive pressure to the intake of the charge-forming device of the engine, the combination including:

a plurality of main fuel supply tanks;
a charge-forming device;
a closed auxiliary fuel container;
first pump means of the type permitting the flow of liquid therethrough in either direction when inoperative mounted within said fuel container adapted to deliver fuel under pressure from said container to the intake of said charge-forming device, said first pump means adapted to be submerged in liquid fuel contained in said container;

a first conduit connected between the discharge of said first pump means and the intake of said charge-forming device for conducting fuel from said first pump means to said charge-forming device;

second pump means of the type permitting the flow of liquid therethrough in either direction when inoperative adapted to withdraw fuel from said supply tanks and to deliver the fuel to said fuel container;

second conduit means connected between the intake of said second pump means and each of said tanks for conducting fluid from said tanks to said second pump means;

a third conduit connected between the discharge of said second pump means and said fuel container for conducting fuel from said second pump means to said container, said second conduit means including valve means controlling the flow of fluid between said second pump means and each of said supply tanks whereby fuel may be withdrawn selectively from said plurality of supply tanks and delivered to said fuel container through said second conduit means and said third conduit when said first and second pump means are actuated and through said overflow conduit means and said second conduit means and said third conduit when said first pump means is actuated and said second pump means is nonactuated;

overflow conduit means for liquid fuel communicating at one end with the interior of said fuel container intermediate the top and the bottom walls thereof and at the other end with each of said supply tanks, said point of communication with the interior of said container being disposed horizontally above said supply tanks, said other end of said overflow conduit means terminating at substantially the lowest point in said supply tanks, said overflow conduit means including a flow-restricting means adapted to regulate the rate at which liquid fuel is conveyed between said supply tanks and said fuel container to a value less than the difference between the rate at which said second pump means is capable of delivering liquid fuel to said fuel container and the rate at which fuel is delivered from said container to said charge-forming device;

valve means disposed in said overflow conduit means between said container and each of said supply tanks controlling the flow of fuel between said container and each of said supply tanks, overflow of fuel from said fuel container to said plurality of supply tanks being selectably controlled by said valve means; and power means, separate from the engine to which said charge-forming device furnishes fuel, for actuating said first and second pump means, said first and second pump means adapted to be actuated at the same time to deliver fuel from said supply tanks to said charge-forming device, each of said first and second pump means being of sufficient capacity when actuated alone, with the other of said pump means being inoperative, for delivering fuel from said supply tanks to said charge-forming device.

References Cited in the file of this patent

UNITED STATES PATENTS

| | | |
|---|---|---|
| 1,849,590 | Phillips | Mar. 15, 1932 |
| 2,006,865 | Lake | July 2, 1935 |
| 2,330,558 | Curtis | Sept. 28, 1943 |
| 2,414,158 | Mock | Jan. 14, 1947 |
| 2,442,639 | Curtis | June 1, 1948 |
| 2,557,438 | Johnson | June 19, 1951 |
| 2,681,694 | Loft | June 22, 1954 |
| 2,781,831 | Angell | Feb. 19, 1957 |
| 2,901,031 | Powell et al. | Aug. 25, 1959 |
| 2,920,690 | Wright | Jan. 12, 1960 |

OTHER REFERENCES

Article, "Handling Heavy Fuel Oil Is an Art" in "Power Engineering" of April 1955, at page 82.